United States Patent
Andreoli-Fang et al.

(10) Patent No.: US 10,237,786 B2
(45) Date of Patent: Mar. 19, 2019

(54) LATENCY REDUCTION FOR VIRTUALIZED SMALL CELLS

(71) Applicant: Cable Television Laboratories, Inc., Louisville, CO (US)

(72) Inventors: Jennifer Andreoli-Fang, Boulder, CO (US); Bernard McKibben, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 51 days.

(21) Appl. No.: 15/453,146

(22) Filed: Mar. 8, 2017

(65) Prior Publication Data

US 2017/0265106 A1 Sep. 14, 2017

Related U.S. Application Data

(60) Provisional application No. 62/357,770, filed on Jul. 1, 2016, provisional application No. 62/353,755, filed
(Continued)

(51) Int. Cl.
| | |
|---|---|
| *H04W 28/20* | (2009.01) |
| *H04W 28/02* | (2009.01) |
| *H04W 72/10* | (2009.01) |
| *H04W 76/14* | (2018.01) |
| *H04W 72/08* | (2009.01) |

(Continued)

(52) U.S. Cl.
CPC ....... *H04W 28/20* (2013.01); *H04W 28/0268* (2013.01); *H04W 28/0278* (2013.01); *H04W 72/085* (2013.01); *H04W 72/10* (2013.01); *H04W 76/14* (2018.02); *H04W 28/24* (2013.01); *H04W 84/042* (2013.01); *H04W 84/12* (2013.01)

(58) Field of Classification Search
CPC . H04W 28/20; H04W 72/14; H04W 28/0278; H04W 72/10; H04W 84/042; H04W 84/12
See application file for complete search history.

(56) References Cited

U.S. PATENT DOCUMENTS 6,157,614 A * 12/2000 Pasternak ........... H04L 12/5601
370/236
7,899,451 B2 * 3/2011 Hu ........................ H04W 48/17
370/328
(Continued)

OTHER PUBLICATIONS

International Search Report in PCT/US17/21918, dated Aug. 16, 2017.

*Primary Examiner* — Bunjob Jaroenchonwanit
(74) *Attorney, Agent, or Firm* — Duft Bornsen & Fettig, LLP

(57) ABSTRACT

Systems and methods presented herein provide for reducing latency in wireless service through a communication link comprising a virtual Modem Termination System (vMTS) and a modem. The communication link is coupled with a virtualized wireless link. In one embodiment, a method includes transferring a buffer status report (BSR) from a user equipment (UE) through the communication link to a control portion of the virtualized wireless link, generating a wireless grant to allow the data of the UE through virtualized wireless link, and generating a backhaul grant for the UE to transfer data through the communication link based on the wireless grant information.

31 Claims, 7 Drawing Sheets

Related U.S. Application Data on Jun. 23, 2016, provisional application No. 62/345,634, filed on Jun. 3, 2016, provisional application No. 62/339,463, filed on May 20, 2016, provisional application No. 62/306,360, filed on Mar. 10, 2016.

(51) Int. Cl.
*H04W 84/12* (2009.01)
*H04W 84/04* (2009.01)
*H04W 28/24* (2009.01)

(56) References Cited

U.S. PATENT DOCUMENTS

| | | | |
|---|---|---|---|
| 8,867,490 | B1 | 10/2014 | Krishna et al. |
| 8,897,312 | B2* | 11/2014 | Pesola .................. G01S 19/21 370/412 |
| 9,754,454 | B2* | 9/2017 | Onorato ............... G07F 17/329 |
| 2005/0159162 | A1* | 7/2005 | Park .................. H04W 72/0406 455/450 |
| 2008/0020797 | A1 | 1/2008 | Denney et al. |
| 2009/0156213 | A1 | 6/2009 | Spinelli et al. |
| 2010/0118752 | A1 | 5/2010 | Suzuki et al. |
| 2010/0172368 | A1* | 7/2010 | Eng .......................... H04J 1/00 370/432 |
| 2010/0284314 | A1 | 11/2010 | Pelletier et al. |
| 2012/0287784 | A1 | 11/2012 | Shatzkamer et al. |
| 2012/0321312 | A1 | 12/2012 | Timm et al. |
| 2013/0010686 | A1 | 1/2013 | Shatzkamer et al. |
| 2013/0142157 | A1* | 6/2013 | Pesola .................... G01S 19/21 370/329 |
| 2014/0056130 | A1 | 2/2014 | Grayson et al. |
| 2014/0328190 | A1 | 11/2014 | Lord et al. |
| 2015/0358838 | A1* | 12/2015 | Wei ....................... H04W 76/15 370/228 |
| 2016/0262169 | A1 | 9/2016 | Das et al. |
| 2017/0244539 | A1 | 8/2017 | Hanna et al. |
| 2017/0280467 | A1* | 9/2017 | Zhu .................. H04W 72/0426 |
| 2017/0330408 | A1* | 11/2017 | Onorato .............. G07F 17/3225 |

* cited by examiner

LATENCY REDUCTION FOR VIRTUALIZED SMALL CELLS

CROSS REFERENCE TO RELATED APPLICATIONS

This patent application claims priority to, and thus the benefit of an earlier filing date from, U.S. Provisional Patent Application Nos. 62/357,770 (filed Jul. 1, 2016), 62/345,634 (filed Jun. 3, 2016), 62/353,755 (filed Jun. 3, 2016), 62/339,463 (filed May 20, 2016), 62/306,360 (filed Mar. 10, 2016), the entire contents of each of which are hereby incorporated by reference.

BACKGROUND

Mobile Network Operators (MNOs) operate a mobile core to provide wireless service to a variety of wireless user equipment (UEs, such as cell phones, laptop computers, tablet computers, etc.). The wireless networks of these MNOs exist in a variety of forms and operate using a variety of modulations, signaling techniques, and protocols, such as those found in WiFi, 3G, 4G, 5G and Long Term Evolution (LTE) networks. Some MNOs even operate with Multiple-System Operators (MSOs), Telecommunications Companies (telcos), satellite operators (including high speed satellite broadband services), fiber operators, and UAV internet providers, collectively referred to as "Operators". For example, Operators routinely provide internet services to the MNOs for backhaul traffic, while the MNO provides wireless services for the Operator. In addition, some Operators operate both the wired services and MNO services.

Now, MSOs are even providing "small cells" such that a UE can communicate through its MNO via an MSO. For example, an MSO may deploy an antenna/interface that a UE can communicate with via its respective wireless protocol. The MSO packages the communications between the UE and the MNO via the MSO's protocol, for example Data Over Cable Service Interface Specification (DOCSIS).

In some instances, functionality of a small cell may be spread across a communication link via virtualization of the components thereof. But, granting data transfer requests from UEs through the communication link is problematic because latency incurs from the serial nature of data transfer grants between the wireless protocol and that of the communication link.

SUMMARY

Systems and methods presented herein provide for reducing latency in wireless service through a request-grant based communication link, for example a DOCSIS communication link. In one embodiment, the communication link comprises a virtualized Modem Termination System (vMTS) and a modem. The communication link is coupled with a virtualized wireless link (e.g., configured from a remote small cell and a central small cell). Other embodiments contemplated utilizing an optical network. An optical network may be formed with, for example, an Optical Network Terminal (ONT) or an Optical Line Termination (OLT), and an Optical Network Unit (ONU), and may utilize optical protocols such as EPON, RFOG, or GPON. Embodiments also contemplated exist in other communication systems capable of backhauling traffic, for example, a satellite operator's communication system. To simplify description, a termination unit such as a CMTS, an ONT, an OLT, a Network Termination Units, a Satellite Termination Units, and other termination systems are collectively called a "Modem Termination System (MTS)". To simplify description a modem unit such as a satellite modem, a modem, an Optical Network Units (ONU), a DSL unit, etc. collectively called a "modem." Further, to simplify description a protocol such as DOCSIS, EPON, RFOG, GPON, Satellite Internet Protocol, is called a "protocol."

In some embodiments, the present system and method handles transferring a bandwidth request message, such as a buffer status report (BSR), from a UE through the communication link to a control portion of the virtualized wireless link, for example residing with the central Small Cell (cSC). For example, in one embodiment, the control portion of the virtualized wireless link signals the vMTS to generate a grant, (e.g., a backhaul grant), for the transmission of the UE data on the communication link. The control portion of the virtualized wireless link also generates a wireless grant for the UE to transfer the data on the virtualized wireless link. It will be understood that the control portion of the virtualized wireless link, e.g., the central Small Cell (cSC), may be configured in a cloud computing system in communication with the wireless core or may be configured in the wireless core. In backhaul wireless core integrated embodiment, the control portion of the virtualized wireless link may be configured with an MTS or vMTS.

In another embodiment, the control portion of the virtualized wireless link signals of a grant for the transmission of the UE data on the communication link. Again, the control portion of the virtualized wireless link also generates a wireless grant for the UE to transfer the data on the virtualized wireless link.

In a separate embodiment, a mediator intercepts or generates a copy of one or both of the BSR sent from the UE to the cSC and the UL grant sent from the cSC to the UE. The mediator unpacks or otherwise decodes all or a portion of the BSR and/or the UL grant to provide data to the vMTS for the generation of a MAP or an unsolicited grant for transmission to the modem. It will be understood that the mediator may be configured with the vMTS or the cSC, configured between the vMTS and the cSC, or configured between the RPD and the vMTS.

In another embodiment, the functionality detailed above for the mediator is integrated into the vMTS itself, such that the vMTS unpacks or otherwise decodes all or a portion of the BSR and/or the UL grant so the vMTS may generate a MAP or an unsolicited grant for transmission to the modem. In this way the modem is prepared for the transmission of UL data as soon as it arrives at the modem thereby significantly reducing latency.

In a separate embodiment, the RPD is replaced with a Remote Device (RD) configured to implement both the PHY and MAC layers (similar to PHY 127 and MAC 126 of FIG. 3) and the mediator is configured between the RD and the vMTS. In this embodiment the mediator intercepts or generates a copy of one or both of the BSR sent from the UE to the cSC and the UL grant sent from the cSC to the UE. The mediator unpacks or otherwise decodes all or a portion of the BSR and/or the UL grant to provide data to a remote device (RD) for the generation of a MAP or an unsolicited grant for transmission to the modem.

In another embodiment, the functionality for the mediator, detailed immediately above, is integrated into the Remote Device itself, such that the RD unpacks or otherwise decodes all or a portion of the BSR and/or the UL grant so the RD may generate a MAP or an unsolicited grant for transmission to the modem. In this way the modem is prepared to transmit UL data as soon as it arrives at the modem, thereby significantly reducing latency.

In an embodiment, the UE implements LTE protocol, although it will be understood that the present invention is equally applicable for use with 2G, 3G, 5G, Wi-Fi and other wireless protocol systems. In an embodiment, the Modem 102 implements DOCSIS protocol, although it will be understood that the present invention is equally applicable for use with satellite, EPON, GPON, and other wired protocol systems.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below. For example, the following description is discussed as applied to an LTE-DOCSIS cooperative network for implementing latency reduction in wireless service between a user device and a wireless core. It will be appreciated that the present latency reduction in the wireless service system and method may equally be applied in systems utilizing macrocells, WiFi, satellite communication systems, optical backhaul systems (EPON, GPON, RFOG), MU-MIMO, laser communication, and even aerial vehicles such as unmanned aerial vehicles (UAV) and balloons that provide wireless and/or laser communication. That is, the present invention may be used in many wireless-to-backhaul systems where at least one of the wireless system or backhaul system utilizes a request-grant protocol for data transmission.

Figure 1:
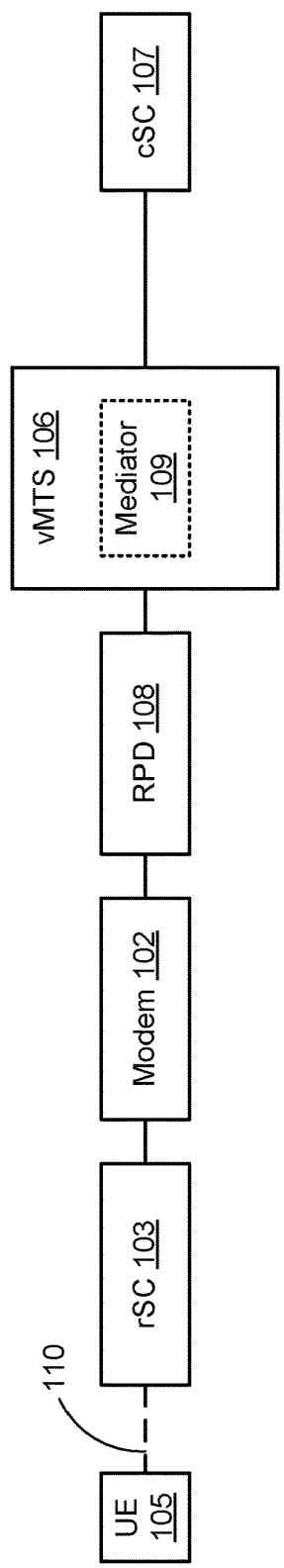
FIG. 1 is a block diagram of exemplary components implementing a virtualized wireless link with a communication link.

FIG. 1 is a block diagram of an exemplary communication link comprising a virtualized Modem Termination System (vMTS) 106, a remote PHY device (RPD) 108, and a modem 102. The communication link is coupled with a virtualized wireless link (e.g., configured from a remote small cell (rSC) 103 and a central small cell (cSC) 107 described in greater detail below). It will be understood that a mediator 109 may be integrated with or communicatively coupled with vMTS 106. The vMTS 106 may be, for example, a CMTS, a Fiber Node, a Fiber Hub, an optical line termination (OLT), or other termination device. Mediator 109 may be implemented, for example, as a software agent in any of such devices. If mediator 109 is integrated with a vMTS, integration may be via software or hardware. Mediator 109 is operable to generate a backhaul grant (an example of which is shown as MAP/unsolicited grant in FIG. 5) for modem 102 in response to a message to cSC 107. The backhaul grant is transmitted close in time to the UL grant sent from cSC 107 to UE 105 such that modem 102, which receives the backhaul grant, can prepare resources to backhaul the UE data at substantially the same time as the UE 105 prepares and transmits the data to the modem 102. This substantially parallel processing by the UE 105 and the modem 102 prepares the modem 102 to backhaul the data when it arrives.

In alternative embodiments, mediator 109 may be situated between vMTS 106 and cSC 107 or configured with or otherwise in communication with cSC 107 such that mediator 109 generates a backhaul grant in response to one or more of the BRS (or one or more wireless grants), an out of band message comprising UL grant information such as a UL grant summary (see FIG. 5), or the UL grant itself. As suggested above, mediator 109 may be implemented as software or hardware, and may be formed within vMTS 106 or cSC 107, as a standalone device placed in the communication line between the vMTS 106 and the cSC 107, or as a component of the vMTS 106 or the cSC 107.

In an embodiment, one of vMTS 106 and mediator 109 generates one or more backhaul grants in response to one or more of the BSRs, one or more PHY Translated Messages (PTM) (see FIG. 5), or one or more wireless grants. In a related embodiment, the number of generated backhaul grants is fewer than the number of BSRs, PTMs, or wireless grants, and may be as few as one backhaul grant or as many as one less than the number of BSRs, PTMs, or wireless grants. In these and other embodiments, the vMTS or mediator 109 aggregates the received BSRs, PTMs, or wireless grants to generate the one or more backhaul grant.

The UE 105 may wirelessly communicate with other UEs (not shown) in a wireless service network for the purpose of transmitting and/or receiving data. A cSC 107 (e.g., control portion of a virtualized wireless link) controls the operations of the UE 105 within the wireless network. This includes, among other things, managing subscription information (e.g., data communication, data plans, roaming, international calling, etc.) and participating in processes that ensure that the UE 105 can place calls and transmit data within the wireless network. Mediator 109 cooperates with the vMTS to provide communications between the UE 105 and the cSC 107 such that the cSC 107 can control the operations of the UE 105, for example, when the UE 105 is within range of a "small cell," such as rSC 103.

In the past, MNOs often maintained, operated, and controlled wireless base stations themselves for the purposes of providing communications with UEs. For example, an MNO employing LTE communications may operate a plurality of base stations in an area to provide wireless services to subscribing UEs in that area.

Now MSOs are capable of acting as backhaul operators. For example, MSOs may engage with MNOs for the purpose of providing alternative backhaul paths for communication between UEs, such as UE 105, and the mobile core (not shown). MSOs and small/independent wireless operators currently employ wireless devices, such as the rSC 103, for capturing a wireless data transmission and passing it through a backhaul system, as shown in FIG. 1. In the embodiment of FIG. 1, the backhaul system includes modem 102, a RPD 108, vMTS 106, and meditator 109. The rSC 103 comprises many of the features of a larger base station such as the air-to-air interface 110 and protocol handling. In some instances, the rSC 103 may be a multi-radio hotspot providing for WiFi, as well as LTE Licensed Assisted Access (LTE-LAA) or LTE Unlicensed (LTE-U).

In an alternative embodiment wireless communication is WiFi communication and is between a STA (not shown) or a WiFi core (not shown). To modify the system of FIG. 1 to accommodate the WiFi embodiment the skilled artisan would replace UE 105 with a WiFi station (STA), rSC 103 with a Wi-Fi transceiver and relevant electronics, and the cSC 107 with a virtualized WiFi controller configured with or otherwise in communication with the Wi-Fi core.

Small cells and similar wireless technologies (collectively discussed and represented herein as small cells) represent new opportunities for MNOs. These new small cells allow operators to access additional spectrum, use existing spectrum more efficiently, and promote greater deployment flexibility, all at a lower cost. Small cells also reduce radio access network build-out and backhaul investment, while improving the end user experience by providing increased access to mobile networks. Additionally, because small cells are much smaller, they can reduce a base station's footprint and have less environmental impact (e.g., in terms of power consumption).

The MSOs and MNOs, evolving from different technologies, generally employ different communication protocols and offer little insight to each other. For example, the MSOs may employ the DOCSIS protocol to transport data to and from a modem 102. The MNOs, on the other hand, may employ a variety of wireless protocols including EDGE (Enhanced Data rates for GSM Evolution), 2G, 3G, 4G, 5G, LTE, or the like. While the vMTS 106 and the modem 102 may be able to transport the wireless service traffic of the UE 105, the vMTS 106 and the modem 102 need not process the data transmitted. Rather, the vMTS 106 and the modem 102 simply route the traffic between the appropriate parties. In the example of FIG. 1, traffic is routed between UE 105 and cSC 107 via rSC 103, modem 102, RPD 108, and vMTS 106.

This lack of insight by the backhaul system into the wireless system's data, and vice versa (e.g., LTE system into the DOCSIS system, and vice versa), previously caused the request to transmit data across the communication link to occur in a serial manner. For example, when the rSC 103 provided a grant to the UE 105 to transfer data to the rSC 103, the modem 102 and the vMTS 106 were unaware that the rSC 103 has provided a grant for a data transfer from the UE 105. When the data arrived at the rSC 103, it was then forwarded to the modem 102. Only when the data arrives at the modem 102 from the rSC 103 did the modem transmit a request to transmit the data to the vMTS 106. The modem-to-MTS grant alerts the vMTS 106 that the modem 102 has data to transmit and requires resources to do so. The vMTS 106 could then schedule resources for the modem 102 and transmit a grant back to the modem 102. The data would then be transferred from the modem 102 to the vMTS 106 and then forwarded on to the cSC 107. This process of serial granting data transfers results in unnecessary latency.

In the case of high-priority data, such as voice data, the unnecessary latency may result in the data being irrelevant by the time it reaches the intended recipient. For example, the UE 105 transfers blocks of data representing relatively small portions of a conversation. When some of the blocks of data are delayed, they may no longer be relevant to the conversation and are as such dropped. When this occurs regularly, the quality of the conversation and the user's quality of experience (QoS) are degraded significantly. Similar issues exist when non-voice data is transmitted across the network, such as signaling traffic, video data (live or stored), security data, access and control over remotely located resources, machine-to-machine applications, etc.

In one embodiment, the UE 105 has issued a scheduling request to transfer data to the cSC 107. For example, the rSC 103 may be a wireless transceiver portion of an eNodeB operable to communicate in an LTE network, or a wireless transceiver portion of a Wi-Fi Access Point (AP) operable to communicate in a WiFi network. The UE 105 (or Wi-Fi STA), when it needs to transfer data, issues a scheduling request (SR) to the cSC 107. The cSC 107 then determines when the UE 105 can transfer data to the cSC 107 and issues an uplink (UL) grant to the UE 105. The UE 105 then transfers its data to the cSC 107 for subsequent processing, routing, and the like.

When the UE 105 has data to transmit the preparation for the transmission process can be a multistep process by itself. For example, if the UE 105 does not have a valid grant, the UE 105 issues an SR then, after receiving the grant, transfers a bandwidth request message, in the present embodiment called a buffer status report (BSR), to the small cell indicating how much data it is requesting to be transferred. The small cell then issues the subsequent grant indicating the actual amount of data that can be transmitted. Upon receiving the grant, the UE 105 transfers its data to the small cell.

To illustrate, the SR may be a 1 bit indicator that the PHY layer (e.g., in the rSC 103) can decode. The rSC 103 may then forward a PHY translated message based on the SR to the cSC 107 via the communication link. The PHY translated message is then transmitted to the modem 102, which generates a DOCSIS request message (REQ) to request resources to accommodate the forth coming BSR on the backhaul system. The vMTS 106 may then generate a grant that is large enough to accommodate the BSR.

Figure 2A:
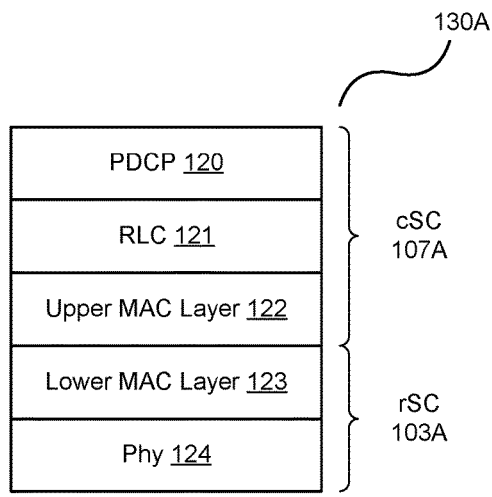
FIG. 2A is a block diagram of an exemplary protocol stack of a virtual base station (vBS).
Figure 2B:
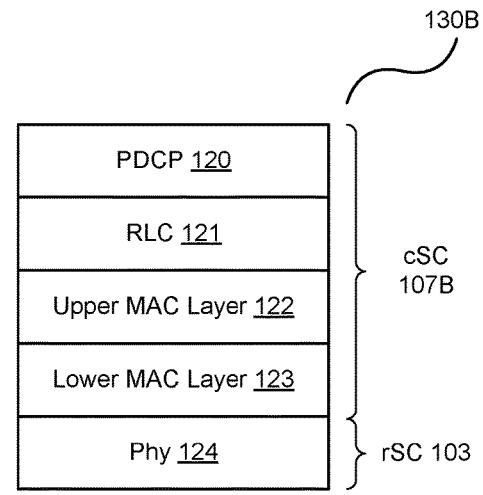
FIG. 2B is a block diagram of another exemplary protocol stack of a virtual base station (vBS).
Figure 3A:
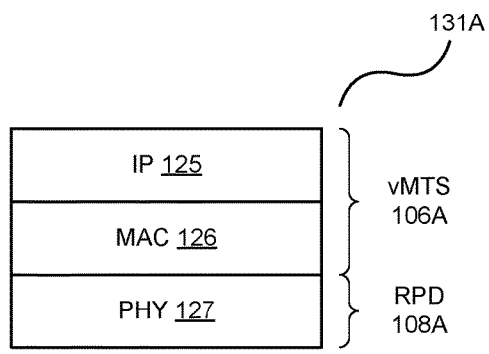
FIG. 3A is a block diagram of an exemplary protocol stack of a Remote PHY Device (RPD) and vMTS.
Figure 3B:
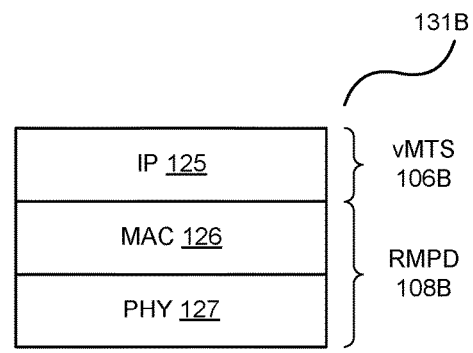
FIG. 3B is a block diagram of an exemplary protocol stack of a Remote MAC PHY Device (RMPD) and vMTS.

As mentioned, the communication link may be configured from at least the vMTS 106 and the modem 102 and the communication link is coupled with a virtualized wireless link. The components of the communication link, as well as the components of the virtualized wireless link, may be virtualized. For example, the components of FIGS. 2A and 2B illustrate block diagrams of protocol stack layers of a virtualized wireless links, shown in FIG. 2A as a vBS protocol stack 130A in an LTE network embodiment and shown in FIG. 2B as a vBS protocol stack 130B in an LTE network embodiment. FIGS. 3A and 3B illustrates block diagrams of MTS protocol stack layers 131A and 131B. The vBS protocol stack 130A and 130B comprise a plurality of protocol layers including a Packet Data Convergence Protocol (PDCP) 120, Radio Link Control (RLC) 121, an upper MAC layer 122, a lower MAC layer 123, and a physical interface (PHY) 124. FIG. 2A differs from FIG. 2B in that PDCP 120, RLC 121, and upper MAC Layer 122 are situated with cSC 107A and lower MAC layer 123 and PHY 124 are situated in rSC 103A in vBS protocol stack 130A while PDCP 120, RLC 121, upper MAC Layer 122, and lower MAC layer 123 are situated with cSC 107B and PHY 124 is situated in rSC 103B in vBS protocol stack 130B. The MTS protocol stacks 131A and 131B comprise a plurality of layers including the IP layer 125, the MAC layer 126, and the PHY 127. FIG. 3A differs from FIG. 3B in that IP layer 125 and the MAC layer 126 are situated with vMTS 106A and the PHY 127A is situated with RPD 108A in MTS protocol stack layers 131A while IP layer 125 is situated with vMTS 106B and the MAC layer 126 and the PHY 127A are situated with RMPD 108B in MTS protocol stack layers 131B. It will be understood that all embodiments discussed herein are directed to embodiments utilizing vBS protocol stack 130A and MTS protocol stack 131A, but embodiments utilizing vBS protocol stack 130B and MTS protocol stack 131B are also contemplated and only require only minor modifications, which are well within the ability of the skilled artisan after reading the present disclosure.

In an embodiment, mediator 109 is situated between a remote MAC/PHY device and a vMTS, such as between RMPD 108B and vMTS 106B, as shown in FIG. 3B.

Utilizing MTS protocol stack layers 131B provides for an additional location mediator 109 may be employed, namely between RMPD 108B and vMTS 106B, which is not shown but is contemplated.

Functionality of the MTS 131 may also be virtualized. For example, the PHY 127 of the MTS 131 may be implemented as a Remote PHY Device, such as RPD 108 which has little to no intelligence, while the remaining core of the MTS 131 (i.e., the IP 125 and the MAC 126) may be virtualized into a separate component, i.e., the vMTS 106.

In a separate embodiment, RPD 108 is replaced by a remote device (RD), not shown. RD is configured to implement the PHY layer and the MAC layer, similar to PHY 127 and MAC 126, respectively. In this embodiment IP 125 remains within vMTS 106.

In whatever configuration, the virtualized wireless link comprises the rSC 103, and the cSC 107.

In one embodiment, the SR is intercepted (or a copy is generated) during its transit from the rSC 103 to the modem 102. From there, the SR (or the copy) is unpacked and transmitted as an out of band message to the modem 102. Once the modem 102 learns of the SR, the modem 102 can alert the vMTS 106 that it will need to transfer data when the modem 102 receives it from the UE 105 (e.g., through the rSC 103). Alternatively, the modem 102 forwards the SR in a manner similar to that of any other received data. It is then up to the vMTS 106 or mediator 109 to process the SR.

Based on the foregoing, the UE 105 is any device, system, software, or combination thereof operable to wirelessly communicate with a wireless service network using any one or more wireless protocols including, 2G, 3G, 4G, LTE, LTE-U, LTE-LAA, or the like, as well as with a WiFi network using any one or more wireless service protocols including 802.11ax. Examples of the UE 105 include laptop computers, tablet computers, and cellular telephones, such as smart phones. The rSC 103 is any device, system, software, or combination thereof operable to provide an air-to-air interface 110 for communication with the UE 105.

Examples of the rSC 103 include WiFi access points and base stations, such as eNodeBs, operating as or part of a vBS in a wireless service network. The modem 102 is any device, system, software, or combination thereof operable to provide data transfers with a MTS. Examples of the modem 102 include but are not limited to a DOCSIS enabled set-top box, an Optical Network Unit or fiber optic modem, and a satellite modem.

The vMTS 106 is any device, system, software, or combination thereof operable to communicate with the modem 102 as well as to facilitate the transmission of wireless session data through the communication link. The cSC 107 is any device, system, software, or combination thereof operable to provide higher layer wireless communication functionality and is in communication with a mobile core or mobile network (not shown). It will be understood that the control portion of the virtualized wireless link is located within or its functionality is configured within cSC 107, but for simplicities sake the cSC 107 is generally referred to herein as the control portion of the virtualized wireless link. However, the control portion of the virtualized wireless link may be implemented with fewer or more protocol layers shown in FIG. 2. Other exemplary embodiments are shown and described below.

Figure 4:
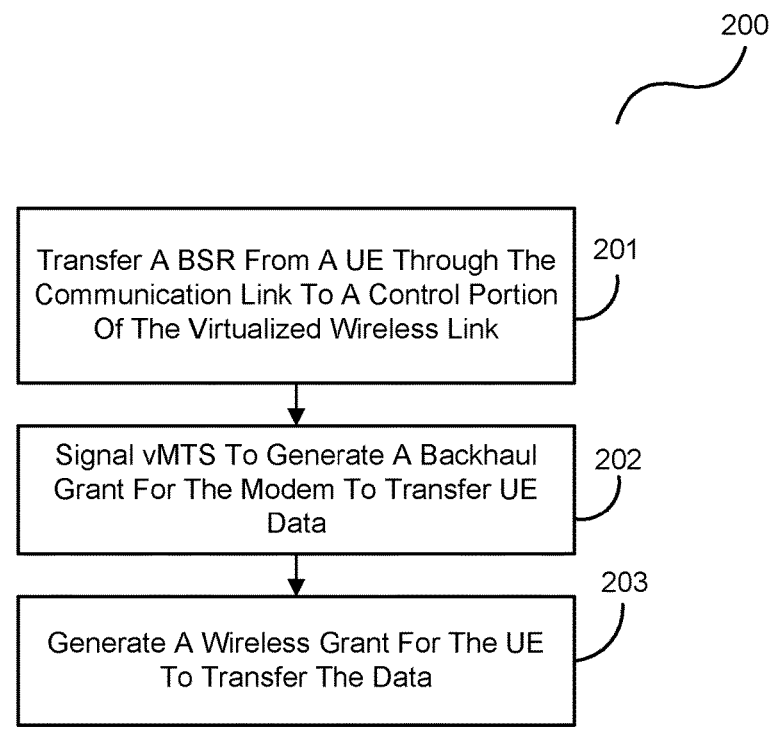
FIG. 4 is a flowchart illustrating an exemplary process operable with the communication link of FIG. 1.

FIG. 4 is a flowchart illustrating an exemplary process 200 operable with the components of FIG. 1. In this embodiment, the UE 105 has data to transmit to a mobile core (not shown) through the communication link. In this regard, the UE 105 transfers a BSR through the communication link to a control portion of the virtualized wireless link (e.g., residing with the cSC 107), in the process element 201. In an LTE example of process element 201, before the UE 105 can transmit its data, the UE 105 first issues a scheduling request (SR) to the rSC 103. The rSC 103 transfers the SR to the modem 102 which forwards it through the communication link to the vMTS 106 and ultimately to the cSC 107, which grants permission for the UE 105 to transmit a BSR.

When UE 105 receives the cSC 107 issued grant, the UE 105 transmits the BSR indicating how much data it has in its buffer and informs the cSC 107 accordingly. Thus, when the cSC 107 receives and processes the BSR, it determines what resources are needed by the UE 105 for transmission. After processing of the BSR by the cSC 107, the cSC 107 ascertains the details of what the UE 105 has to transmit. The cSC 107 (or possibly the vMTS 106), decides and then instructs the UE 105 as to what will be transmitted. The cSC 107 generates a wireless grant (e.g., an LTE grant) for the UE to transfer an amount of data on the virtualized wireless link and signals or otherwise provides processable data to the vMTS 106A or 106B of the MTS protocol stack 131A, 131B, which generates a backhaul grant for the modem 102 to forward the amount of data from UE 105 on the communication link, in the process element 202. Alternatively or additionally, the vMTS 106A or 106B may comprise the functionality of the cSC 107 such that it may process the BSR to determine what the UE 105 will transmit. Alternatively or additionally, the mediator 109 may reside between the vMTS 106A or 106B and the cSC 107A or 107B (e.g., software, hardware, or a combination thereof) and may be enabled to unpack the LTE grant generated by the cSC 107A or 107B for processing and generating, for example, as an out of band message to the vMTS 106A or 106B. The out of band message provides information to the vMTS 106A or 106B so that it may generate a backhaul grant for transmission to the modem 102.

In any case, the cSC 107 generates the wireless grant based on the BSR, in the process element 203. Since the cSC 107 or the mediator 109 is operable to inform the vMTS 106 of the amount of data that is to be transmitted by the UE 105 as well as the precise timing of the data transmission by the UE 105, which has all been captured in the out of band message, the vMTS 106 can issue a backhaul grant for the UE 105 to transfer its data at or about the same time the vMTS 106 receives the LTE grant generated by the cSC 107. This substantially simultaneous transmission of LTE and backhaul grants through the communication link greatly diminishes the latency involved with existing systems and methods.

Figure 5:
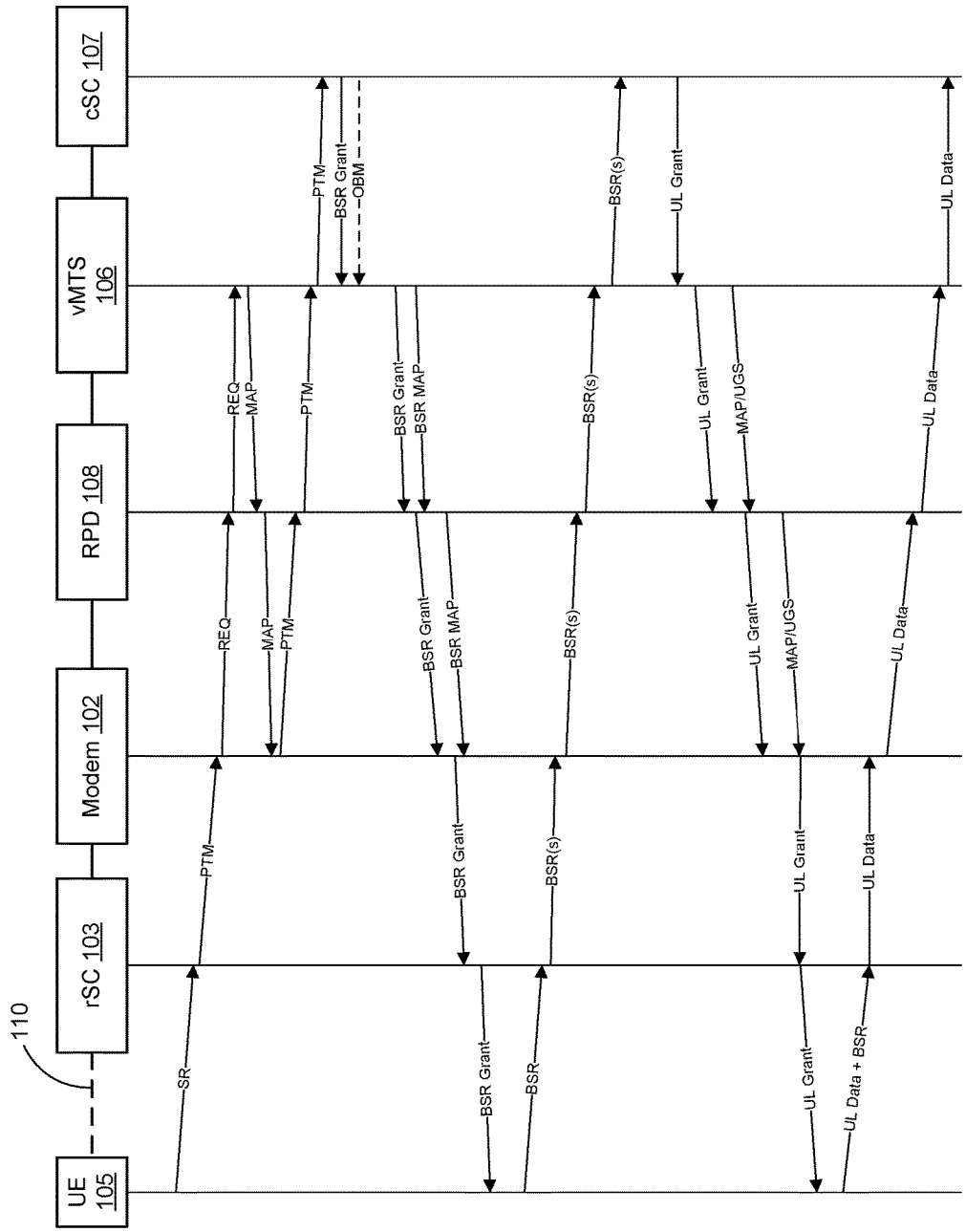
FIG. 5 is an exemplary communication diagram operable with components of FIG. 1.

FIG. 5 is an exemplary communication diagram of the components of FIG. 1. An SR-BSR process and a BSR-UL Data process are described. The SR-BSR process, which covers from the transmission of the SR from the UE 105 to the receipt of the BSR Grant by the UE 105, instructs the cSC 107 that UE 105 requires resources for the transmission of a BSR thereby satisfying the scheduling request (SR). The BSR-UL Data process, which covers from the transmission of the BSR by the UE 105 to the receipt of the UL Data at the cSC 107, satisfies the BSR, which is a request to transmit UL data. An exemplary SR-BSR process is described first, followed by an exemplary BSR-UL Data process.

The UE 105 transmits a scheduling request (SR) to rSC 103. The PHY 124 (see FIG. 2) of the rSC 103 processes the SR and generates a PHY translated message (PTM), which is sent to the modem 102. In response to receiving the PTM, the modem 102 generates and transmits a request for resources (REQ) to the vMTS 106 via the RPD 108A or RMPD 108B (or a remote device (RD) as described above) such that modem 102 may transmit the PTM to the vMTS 106 and cSC 107. Upon receipt of the REQ the vMTS 106 generates and transmits a MAP to the modem 102 via RPD 108 such that modem 102 may transmit the PTM to the vMTS 106. Upon receipt of the MAP, the modem 102 transmits the PTM to the cSC 107 via RPD 108 and vMTS 106. The cSC 107 processes the PTM to issue a UL Grant back to the UE 105 and, optionally, an out of band message (OBM) to the vMTS 106 which preemptively generates a MAP for the forthcoming BSR. The MAP for the BSR is then transmitted to the modem 102, such that upon receipt of the BSR the modem 102 is prepared to immediately forward the BSR to the cSC 107. Alternatively an OBM is not utilized and the vMTS 106, upon receipt of the BSR grant, generates a BSR MAP, which is sent to modem 102 and utilized in the same manner as described above. Alternatively, the vMTS 106A periodically polls the modem 102 to see if the modem 102 has SR or BSRs to transmit. Still alternatively, the vMTS 106A provides to the modem 102 periodic, small amount of grants sufficient to send one or multiple BSRs. In either case, the periodicity can be for example every 1 ms or longer. The grant size can be adapted according to the number of BSRs have been historically received in 1 ms time intervals. Based on the foregoing, BSRs can be forwarded immediately to the cSC 107A by the modem 102. Similar functionality exists within and between vMTS 106B and cSC 107B, with only minor modifications that would be apparent to the skilled artisan after reading the present disclosure.

In this embodiment, the UE 105 has data to transmit, and as such, it issues a BSR to the rSC 103. The rSC 103 transfers the BSR to the modem 102 which propagates it to the RPD 108. The RPD 108 prioritizes or is instructed to prioritize the transfer of BSR among other traffic it receives and then transfers the BSR to the vMTS 106 and ultimately to the cSC 107, which generates a grant of all or a portion of the UE 105's UL data. In an embodiment, upon receiving the BSR, the cSC 107 provides the vMTS 106 (e.g., via an out of band signaling message) with data regarding the UL data grant, for example, with a UL Grant summary. The UL Grant summary may contain data pertaining to when and how much of the UL data from the UE 105 was granted. This provides the vMTS 106 with the data it requires to perform its scheduling and to generate a backhaul grant (e.g., a DOCSIS MAP or some other granting mechanism) for the UL data from the UE 105. As described above, the backhaul grant is sent from the vMTS 106 to modem 102, shown in FIG. 5 as MAP/unsolicited grant.

Thus, when the vMTS 106 receives the UL grant summary from the cSC 107, the vMTS 106 is operable to process it and generate the backhaul grant transmission to the modem 102 at or about the same time as the vMTS 106 transmits the UL grant (e.g., the wireless grant, also called a UL data grant herein) for the UL data of the UE 105. The UL data grant and the backhaul grant propagate through the communication link until they reach their intended destinations. The RPD 108 prioritizes or is instructed to prioritize the transfer of the UL data grant and the backhaul grant among other traffic it receives. For example, when the backhaul grant reaches the modem 102, the modem 102 is ready for the UL data from the UE 105. And, when the UL grant reaches the UE 105, the UE 105 transfers its UL data to the rSC 103 at its allocated time. Since the modem 102 already has the backhaul grant, the modem 102 can transmit the UL data from the UE 105 at its allocated time, which may be as soon as it receives it from the rSC 103.

Moreover, as the rSC 103 may be communicating with a plurality of UEs 105, the rSC 103 may collect a plurality of BSRs from the UEs 105 and forward those to the modem 102. The modem 102 may transmit those to the vMTS 106 which forwards them to the cSC 107. In an out of band message, the cSC 107 may summarize the amount of data of the UL grants that are to be issued to the plurality of UEs 105. With this information, the vMTS 106 can also provide unsolicited grants to the modem 102 when capacity is available. But, the vMTS 106 may do so with the knowledge that is not supplying too much granted capacity.

For example, the vMTS 106 may be operable to issue unsolicited grant to the modem 102 such that it may transfer data without requesting. The vMTS 106 may retain size values of the BSRs, such that when the vMTS 106 has spare capacity, the vMTS 106 can better estimate how much spare data transfer capacity the modem 102 might need in response to UL grants of the UEs 105.

To illustrate, the vMTS 106 may store in memory the amount of data associated with the data transfer (and optionally all previous UE data transfers). The vMTS 106 may then be operable to issue unsolicited data transfer grants through an unsolicited grant or some other unsolicited grant based on that information. When the vMTS 106 has spare capacity, the vMTS 106 can transfer an unsolicited grant to the modem 102 without being requested to do so such that the modem 102 can transfer data (UE data and/or modem data) if it has any without delay associated with a request-grant process. By retaining the size value of the data associated with the previous UE data transfers (and optionally all previous UE data transfers), the vMTS 106 can better estimate how much spare data transfer capacity can be issued through unsolicited grants and further decrease system latency.

In one illustration, UEs 105(1)-(4) (not shown) request data transfers to the rSC 103 at or about the same time. For example, UE 105(1) needs to transmit two bytes of data, UEs 105(2) and UEs 105(3) need to transmit four bytes of data each, and UE 105(4) needs to transmit six bytes of data, thus totaling 16 bytes of data. The rSC 103 may combine the data transfer information into a BSR for transmission to the vMTS 106. The vMTS 106 may use this information to generate subsequent unsolicited grant of 16 bytes of data such that all of the data from UEs 105(1)-(4) may be transferred at substantially reduced latency.

The vMTS 106 may determine any type of typical unsolicited grant sizes for the modem 102. For example, the vMTS 106 may average the data sizes of BSRs from the rSC 103 over time, may use data sizes of one or multiple UEs 105, may base the data sizes of the unsolicited grants on a time of day, or the like. In any case, when the vMTS 106 has spare capacity and determines a size of the unsolicited grant, the vMTS 106 may transfer the unsolicited to the modem 102, such that the modem 102 can transfer data of the UE 105 that it receives from the rSC 103.

Although shown or described in a particular form of messaging, the invention is not intended to be limited to the exemplary embodiment.

Figure 6:
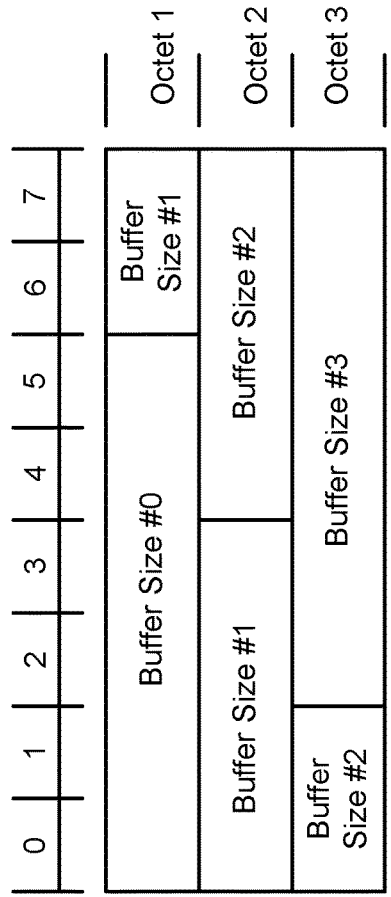
FIG. 6 is a block diagram of an exemplary BSR.

FIG. 6 is a block diagram of an exemplary buffer status report (BSR) operable with the components of FIG. 1. As mentioned, in LTE, the SR is typically a 1-bit indicator sent by UE 105 to request UL bandwidth. But, the SR alone is not sufficient for a vBS. Rather, the vBS needs more information about a size of the data before it can grant a data transfer to the UE 105. So, the UE 105 transmits a BSR. A media access control (MAC) scheduler generally assigns UL resources based on the BSR. So, the cSC 107 sends a grant of sufficient size for the BSR.

As illustrated in FIG. 5, the BSR is configured as a 4-byte MAC control element that reports outstanding data for each of UE 105's four logical channel groups. The mapping of a radio bearer (i.e., a logical channel) to a logical channel group (LCG) is done at the session setup time by rSC 103 based on the corresponding Quality of Service (QoS) attributes of the radio bearers (e.g., QoS Class Identifier (QCI), an Allocation and Retention Priority (ARP), a Guaranteed Bit Rate (GBR), a Maximum Bit Rate (MBR), an Access Point Name-Aggregate Maximum Bit Rate (APN-AMBR), a UE-AMBR, etc.). For example, radio resource control (RRC) messages map to LCGO. The embodiments herein allow the LCG to be directly mapped to a DOCSIS upstream service flow.

The BSR message is also operable to indicate the amount and the QoS requirement of the data that the UE 105 wishes to transfer to the rSC 103. The LTE grant is generated by the rSC 103 for the UE 105 and indicates the amount of data the UE 105 is to transmit, the time of transmission, and the QoS assignment of the data. Knowing the precise amount, the timing, and the QoS assignment of the expected data arrival at the rSC 103 helps the vMTS 106 to determine the size, timing, and the QoS assignment of the grant over the communication link. This will also give the vMTS 106 ample time to schedule a grant for the modem 102 to transfer data from the UE 105 to the vMTS 106 over the communication link.

Figure 7:
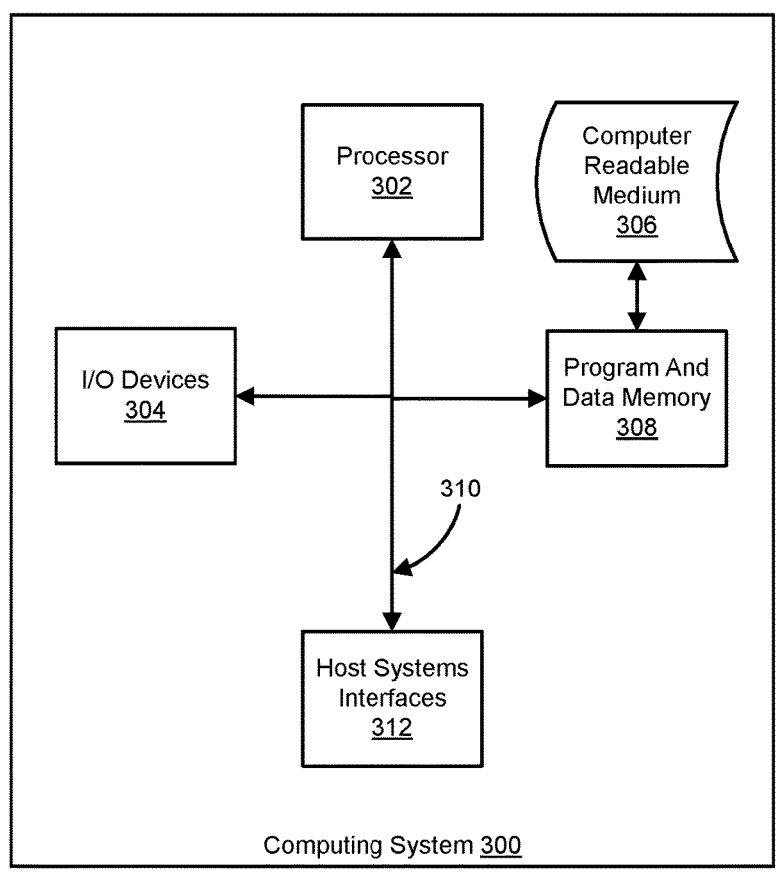
FIG. 7 is a block diagram of an exemplary computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 7 illustrates a computing system 300 in which a computer readable medium 306 may provide instructions for performing any of the methods disclosed herein.

Furthermore, the invention can take the form of a computer program product accessible from the computer readable medium 306 providing program code for use by or in connection with a computer or any instruction execution system. For the purposes of this description, the computer readable medium 306 can be any apparatus that can tangibly store the program for use by or in connection with the instruction execution system, apparatus, or device, including the computer system 300.

The medium 306 can be any tangible electronic, magnetic, optical, electromagnetic, infrared, or semiconductor system (or apparatus or device). Examples of a computer readable medium 306 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 300, suitable for storing and/or executing program code, can include one or more processors 302 coupled directly or indirectly to memory 308 through a system bus 310. The memory 308 can include local memory employed during actual execution of the program code, bulk storage, and cache memories which provide temporary storage of at least some program code in order to reduce the number of times code is retrieved from bulk storage during execution. Input/output or I/O devices 304 (including but not limited to keyboards, displays, pointing devices, etc.) can be coupled to the system either directly or through intervening I/O controllers. Network adapters may also be coupled to the system to enable the computing system 300 to become coupled to other data processing systems, such as through host systems interfaces 312, or remote printers or storage devices through intervening private or public networks. Modems and Ethernet cards are just a few of the currently available types of network adapters.

Figure 8:
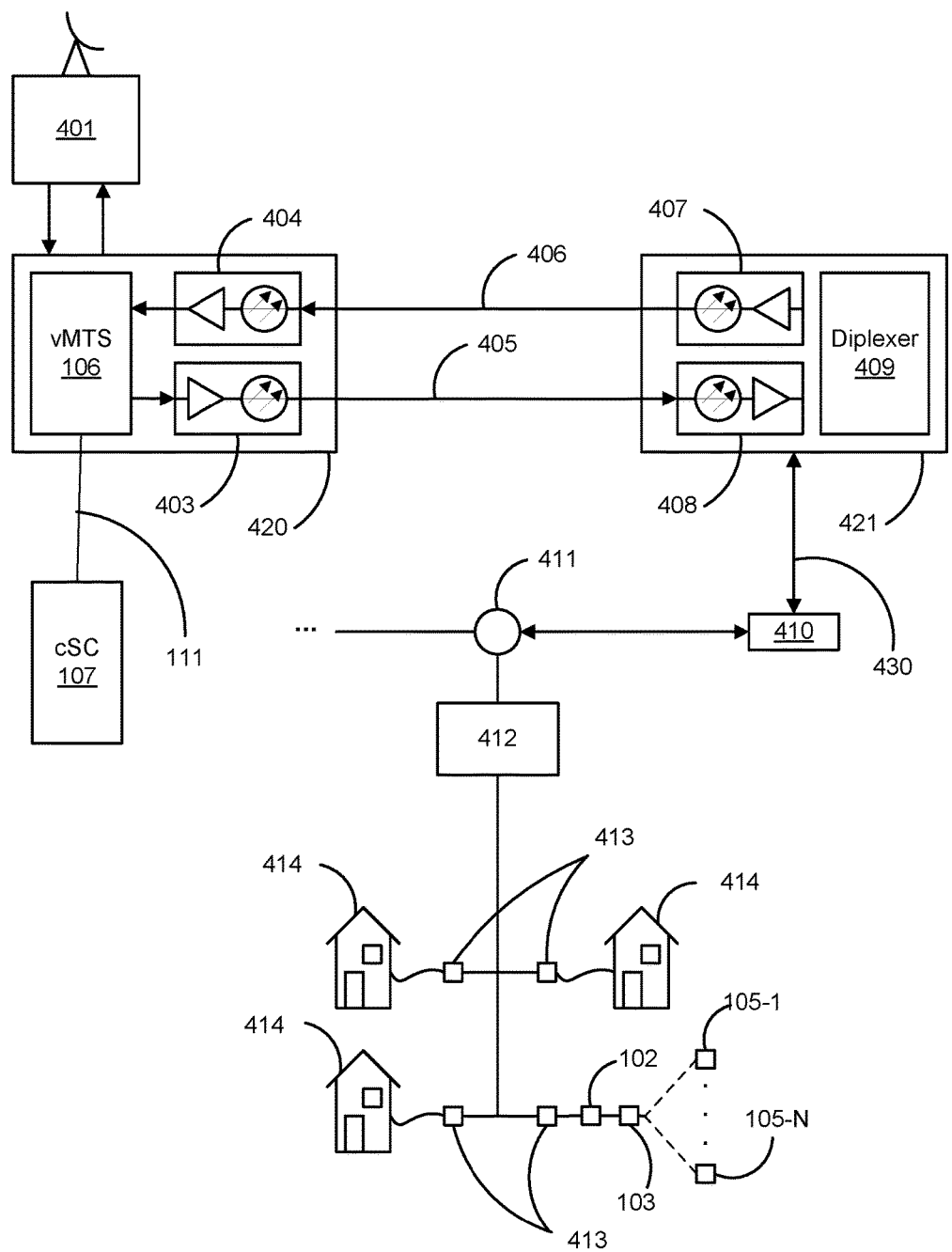
FIG. 8 is a block diagram of a communication system operable to implement the embodiments herein.

FIG. 8 is a block diagram of an exemplary system operable to provide wireless service for a plurality of UEs 105-1-105-N (where "N" is simply intended to represent an integer greater than "1" and not necessarily equal to any other "N" reference designated herein). For example, upstream and downstream links of an exemplary communication system offers high speed data services over connected devices, such as the modem 102. The modem 102 may be configured with or receive communications from the rSC 103 so as to allow the UEs 105 to communicate through the communication system in a manner that is transparent to the user.

The communication system includes a communication component 401 configured with an upstream hub 420. The hub 420 is coupled to a fiber node 421 via optical communication links 405 and 406. The hub 420 includes a Modem Termination System (MTS) 106 an electrical to optical converter 403, and an optical to electrical converter 404. The node 421 is similarly configured with an optical to electrical converter 408 and an electrical to optical converter 407.

The communication component 401 is the source for various communication signals. Antennas may receive communication signals that are converted as necessary and transmitted over fiber optic cables 405 to the hub 420. Several hubs may be connected to a single communication component 401 and the hub 420 may each be connected to several nodes 421 by fiber optic cable links 405 and 406. The vMTS 106 may be configured in the communication component 401 or in the hub 420.

Downstream, such as in homes/businesses, are devices that operate as data terminals, such as modem 102. For example, a modem can acts as a host for an Internet Protocol (IP) device such as personal computer. However, the modem can be configured with a small cell so as to provide wireless services through the system for the UEs 105-1-105-N.

In this embodiment, transmissions from the vMTS 106 to the modem are carried over the downstream portion of the communication system generally in the band between 54 MHz and 3 GHz. Downstream digital transmissions are continuous and are typically monitored by many modems. Upstream transmissions from the modems to the vMTS 106 are, for example, typically carried in the 5-600 MHz frequency band, the upstream bandwidth being shared by the Modems that are on-line. However, with greater demands for data, additional frequency bands and bandwidths are continuously being deployed in the downstream and upstream paths. It is also possible that modems and the MTS engage in full duplex transmission modes, whereby concurrent transmissions on the upstream and the downstream over the same frequency are supported. Equivalent communications and protocols for fiber optic transmissions are also contemplated, for example, using an optical network terminal (ONT) or optical line termination (OLT), and an optical network unit (ONU), and equivalent protocols such as EPON, RFOG, or GPON.

The vMTS 106 connects the system to the Internet backbone. The vMTS 106 connects to the downstream path through an electrical to optical converter 404 that is connected to the fiber optic cable 406, which in turn, is connected to an optical to electrical converter 408 at the node 421. The signal is transmitted to a diplexer 409 that combines the upstream and downstream signals onto a single cable. The diplexer 409 allows the different frequency bands to be combined onto the same cable.

After the downstream signal leaves the node 421, the signal is may be carried by a coaxial cable 430. At various stages, a power inserter 410 may be used to power the coaxial line equipment, such as amplifiers or other equipment. The signal may be split with a splitter 411 to branch the signal. Further, at various locations, bi-directional amplifiers 412 may boost and even split the signal. Taps 413 along branches provide connections to subscriber's homes 414 and businesses.

Upstream transmissions from subscribers to the hub 420/ headend 401 occur by passing through the same coaxial cable 430 as the downstream signals, in the opposite direction on a different frequency band. The upstream signals may be sent typically utilizing Quadrature Amplitude Modulation (QAM) with forward error correction. The upstream signals can employ QPSK or any level of QAM, including 8 QAM, 32 QAM, 64 QAM, 128 QAM, 256 QAM, 512 QAM, 1024 QAM, and 4096 QAM. Modulation techniques such as Synchronous Code Division Multiple Access (S-CDMA) and Orthogonal Frequency Division Multiple Access (OFDMA) can also be used. Of course, any type of modulation technique can be used, as desired.

Upstream transmissions, in this embodiment, can be sent in a frequency/time division multiplexing access (FDMA/TDMA) scheme. The diplexer 409 splits the lower frequency signals from the higher frequency signals so that the lower frequency, upstream signals can be applied to the electrical to optical converter 407 in the upstream path. The electrical to optical converter 407 converts the upstream electrical signals to light waves which are sent through fiber optic cable 405 and received by optical to electrical converter 403 in the node 420. The fiber optic links 405 and 406 are typically driven by laser diodes, such as Fabry Perot and distributed feedback laser diodes.

What is claimed is:

1. A method for reducing latency in wireless services through a communication link comprising a virtualized Modem Termination System (vMTS) and a modem, wherein the communication link is coupled with a virtualized wireless link, the method comprising:
    transferring a bandwidth request message from a user equipment (UE) through the communication link to a control portion of the virtualized wireless link indicating the UE has data to transmit to a wireless core;
    receiving a wireless grant from the wireless core which provides for the data of the UE to pass through virtualized wireless link to the wireless core;
    generating a backhaul grant for the data of the UE to transfer data through the communication link based on one of the bandwidth request message and the received wireless grant.

2. The method of claim 1, further comprising:
    transferring a plurality of bandwidth request messages from a plurality of UEs through the communication link to the control portion of the virtualized wireless link indicating that each UE has data to transmit to the wireless core;
    receiving a plurality of wireless grants to provide for the data of the plurality of UEs through virtualized wireless link to the wireless core;
    aggregating one of the bandwidth request messages and the plurality of wireless grants; and
    generating one or more backhaul grants from the aggregated one of the bandwidth request messages and plurality of wireless grants to transfer data through the communication link to the wireless core.

3. The method of claim 1, wherein the one or more backhaul grants is fewer than the plurality of wireless grants.

4. The method of claim 3, further comprising:
    prioritizing the plurality of wireless grants before transfer to the plurality of UEs.

5. The method of claim 3, further comprising prioritizing the one or more backhaul grants before transfer to the modem.

6. The method of claim 3, further comprising generating the plurality of wireless grants according to one or more of Long Term Evolution (LTE) protocol and Wi-Fi protocol.

7. The method of claim 3, further comprising:
    extracting data transfer sizes, data transfer times, and priorities of the data being transferred by the plurality of UEs from the plurality of one or both of bandwidth request messages and wireless grants; and
    configuring a data size of the grants, a timing of the grants, and a priority of the grants from the vMTS to the modem based on the extracted data transfer sizes, data transfer times, and priorities.

8. The method of claim 7, further comprising:
    generating the backhaul grants for the communication link based on extracted data transfer sizes, data transfer times, and priorities; and
    transferring the data from the plurality of UEs through the communication link based on the extracted data transfer sizes, data transfer times, and priorities.

9. The method of claim 1, further comprising:
    virtualizing the wireless link by configuring Packet Data Convergence Protocol (PDCP), Radio Link Control (RLC), and a lower and an upper Media Access Control (MAC) layer functionality of an eNodeB with the vMTS.

10. The method of claim 1, further comprising virtualizing the wireless link by configuring PDCP, RLC, and MAC functionality of an eNB with a central small cell and PHY functionality with a remote small cell.

11. The method of claim 10, wherein the central small cell is configured with the wireless core.

12. The method of claim 10, wherein the central small cell is configured in the cloud and in communication with the wireless core.

13. The method of claim 1, further comprising virtualizing the wireless link by configuring PDCP, RLC, and Upper MAC functionality of an eNB with a central small cell and Lower MAC and PHY functionality with a remote small cell.

14. The method of claim 1, further comprising virtualizing the wireless link by configuring a Physical (PHY) layer functionality of an eNodeB with the modem.

15. The method of claim 1, further comprising:
virtualizing the wireless link by configuring PDCP, RLC, and an upper MAC layer functionality of an eNB with the vMTS, and virtualizing the wireless link by configuring a PHY and lower MAC layer functionality of an eNB with the modem.

16. A non-transitory computer readable medium operable with one or more processors in a communication link comprising a virtualized Modem Termination System (vMTS) and a modem, wherein the communication link is coupled with a virtualized wireless link, the computer readable medium comprising instructions that, when executed by the one or more processors, direct the one or more processors to:
transfer a buffer status report (BSR) from a user equipment (UE) through the communication link to a control portion of the virtualized wireless link;
generate a backhaul grant for the UE to transfer data through the communication link in response to the BSR; and
generate a wireless grant to allow the data of the UE through virtualized wireless link.

17. The computer readable medium of claim 16, further comprising instructions that direct the one or more processors to:
transfer a plurality of BSRs from a plurality of UEs through the communication link to the control portion of the virtualized wireless link;
generate a plurality of backhaul grants to transfer data through the communication link in response to the plurality of BSRs; and
generate a plurality of wireless grants to allow the data of the plurality of UEs through virtualized wireless link.

18. The computer readable medium of claim 17, further comprising instructions that direct the one or more processors to:
prioritize the plurality of wireless grants before transfer to the plurality of UEs.

19. The computer readable medium of claim 17, further comprising instructions that direct the one or more processors to:
generate the plurality of wireless grants according to one or more of the following protocols: Long Term Evolution (LTE) and WiFi.

20. The computer readable medium of claim 17, further comprising instructions that direct the one or more processors to:
extract data transfer sizes, data transfer times, and priorities of the data being transferred by the plurality of UEs from the plurality of BSRs; and
configure a data size of the grants, a timing of the grants, and a priority of the grants from the vMTS to the modem based on the extracted data transfer sizes, data transfer times, and priorities.

21. The computer readable medium of claim 20, further comprising instructions that direct the one or more processors to:
transfer the data from the plurality of UEs through the communication link based on the extracted priorities.

22. The computer readable medium of claim 16, further comprising instructions that direct the one or more processors to:
virtualize the wireless link by configuring Packet Data Convergence Protocol (PDCP), Radio Link Control (RLC), and a lower and a upper Media Access Control (MAC) layer functionality of an eNodeB with the vMTS.

23. The computer readable medium of claim 16, further comprising instructions that direct the one or more processors to:
virtualize the wireless link by configuring a Physical (PHY) layer functionality of an eNodeB with the modem.

24. A system for reducing latency in wireless service through a communication link, the system comprising:
a virtual Modem Termination System (vMTS) and a modem implementing the communication link in communication with a virtualized wireless link;
wherein the virtualized wireless link transfers a buffer status report (BSR) from a user equipment (UE) through the communication link to a control portion of the virtualized wireless link, and to generate a wireless grant to allow the data of the UE through virtualized wireless link,
wherein the vMTS generates a backhaul grant for the UE to transfer data through the communication link in response to the BSR.

25. The system of claim 24, wherein:
the virtualized wireless link transfers a plurality of BSRs from a plurality of UEs through the communication link to the control portion of the virtualized wireless link, and to generate a plurality of wireless grants to allow the data of the plurality of UEs through virtualized wireless link; and
the vMTS further generates a plurality of backhaul grants to transfer data through the communication link in response to the plurality of BSRs.

26. The system of claim 25, wherein:
the virtualized wireless link further prioritizes the plurality of wireless grants before transfer to the plurality of UEs.

27. The system of claim 25, wherein:
the virtualized wireless link further generates the plurality of wireless grants according to one or more of the following protocols: Long Term Evolution (LTE) and WiFi.

28. The system of claim 25, wherein:
the virtualized wireless link further extracts data transfer sizes, data transfer times, and priorities of the data being transferred by the plurality of UEs from the plurality of BSRs, and to configure a data size of the grants, a timing of the grants, and a priority of the grants from the vMTS to the modem based on the extracted data transfer sizes, data transfer times, and priorities.

29. The system of claim 28, wherein:
the virtualized wireless link further transfers the data from the plurality of UEs through the communication link based on the extracted priorities.
30. The system of claim 24, wherein:
the vMTS virtualizes the wireless link by configuring Packet Data Convergence Protocol (PDCP) and Radio Link Control (RLC) functionality of an eNodeB with the vMTS.
31. The system of claim 24, wherein:
the modem virtualizes the wireless link by configuring a Physical (PHY) layer functionality of an eNodeB with the modem.

* * * * *